United States Patent Office 3,442,870
Patented May 6, 1969

3,442,870
CURABLE MIXTURES COMPRISING A COMPOUND CONTAINING AT LEAST TWO β-METHYLENE-PROPIOLACTONE GROUPS AND A CROSS-LINKING AGENT
Friedrich Lohse, Allschwil, and Hans Batzer, Arlesheim, Switzerland, assignors to Ciba Limited, Basel, Switzerland, a Swiss company
No Drawing. Filed Jan. 4, 1965, Ser. No. 423,387
Claims priority, application Switzerland, Jan. 7, 1964, 76/64
Int. Cl. C08g 17/017, 17/02
U.S. Cl. 260—78.3                                    5 Claims

ABSTRACT OF THE DISCLOSURE

Curable compositions comprising (1) a compound containing at least two β-methylene-propiolactone groupings of the formula $$[-CH=\overset{O-CO}{\underset{|}{C}}-\overset{|}{CH}-]$$

obtained by reacting a monocarboxylic acid halide of the formula $$R_1-CH_2-COX$$

and a dicarboxylic acid halide of the formula $$XOC-CH_2R_2-CH_2-COX$$

in the presence of an inert solvent with an amount of a tertiary amine equivalent to the carboxylic acid halide groups, $R_1$ being hydrogen, monovalent aliphatic hydrocarbon, aromatic hydrocarbon, cycloaliphatic hydrocarbon or araliphatic hydrocarbon radical and $R_2$ being divalent aliphatic hydrocarbon, aromatic hydrocarbon, and X being chlorine, bromine or iodine, and (2) a cross-linking agent for the polylactone (1).

---

The present invention relates to the reaction of certain polylactones with curing agents that are capable of causing a cross-linking of the polylactones to form masses that are suitable as coatings, laminating materials, interlayers, adhesives, castings and mouldings, or for sealing and potting (embedding) purposes.

Compounds used are those whose molecule contains more than one diketen grouping. In the present-day view the diketen grouping is held to be in the lactone form so that the compounds may also be looked upon as substituted β-methylene-propiolactones.

Such polylactones are obtained when a monocarboxylic acid halide and a dicarboxylic acid dihalide are dissolved in an inert solvent and mixed with a tertiary amine, which is used in an amount equivalent to the carboxylic acid halide groups, and which is dissolved in the same solvent. This leads to an exothermic reaction which produces a spontaneous precipitation of the hydrohalide or hydrochloride of the tertiary amine and formation in situ of the monomeric ketens I and II, for example according to the following scheme of reactions:

$nR_1-CH_2-COX+mXCO-CH_2-R_2-CH_2-COX$
$+(n+2m)\cdot N(R_3)_3 \rightarrow n[R_1-CH=C=O]+m$
$[O=C=CH-R_2-CH=C=O]+(n+2m)\cdot N(R_3)_3,HX$ in which $R_1$ and $R_2$ each represents a monovalent or, respectively, divalent aliphatic, aromatic, cycloaliphatic or araliphatic radical which may be substituted by halogen atoms and/or whose chain may be interrupted by oxygen or sulfur atoms, or in which $R_1$ may also represent hydrogen. The radicals $R_3$ represent aliphatic or araliphatic radicals, X represents bromine, iodine or preferably chlorine, $n$ and $m$ each is a small whole number. The compounds I and II are only obtained as intermediates; in the isolated product the substances are already present in the dimerized form.

By variation of the carboxylic acid halides selected or by variation of their proportions used, resinous poly(β-methylene-propiolactones) of diverse compositions and viscosities can be obtained.

As starting materials for the compound I there may be used any desired monocarboxylic acid halide that contains at least two carbon atoms and corresponds to the formula

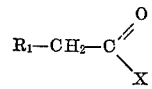

in which $R_1$ and X have the same meanings as above. Advantageously, there are used the halides, especially chlorides, of acetic, propionic, butyric, valeric, caproic, lauric, palmitic, stearic, β-ethyloxypropionic or γ-phenoxybutyric acid.

As starting materials for the compound of the Formula II there are used dicarboxylic acid dihalides of the formula

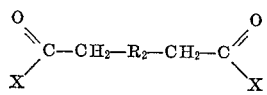

in which $R_2$ and X have the same meanings as above being more especially the dihalides, especially chlorides, of sebacic, azelaic, suberic or pimelic acid, as well as the dihalides and dichlorides of para-phenylenediacetic acid, ethyleneglycol di-(β-carboxyethyl)-ether, butane-1,4-diol - di - (β-carboxyethyl)-ether, butene-1,4-diol-di-(β - carboxyethyl) - ether, xyleneglycol - di-(β-carboxyethyl)-ether, diomethane-O,O' -diacetic acid [=2,2-bis-(para[carboxymethoxy]phenyl)propane].

As solvent there are suitable all those which are inert towards acid halides and diketen groupings, especially those in which the resulting tertiary amine hydrohalide or chloride is very sparingly soluble, so that the working up of the reaction mixture is facilitated. Specifically, there may be mentioned benzene, toluene, xylene, ethylbenzene, dioxane, chlorobenzene and diethyl ether.

As tertiary amines, which are used for eliminating hydrogen halide, there may be mentioned tertiary aliphatic amines, such as trimethylamine, triethylamine, tripropylamine, tributylamine and triamylamine; furthermore heterocyclic and aromatic tertiary amines, such as pyridine, N,N-dimethylaniline, N,N-diethylaniline, N-methylpiperidine and N-ethylpiperidine. In general, preferred use is made of triethylamine.

The elimination of hydrogen halide, or hydrogen chloride is advantageously carried out at a temperature ranging from —20° to +80° C. When the addition of the tertiary amine has been completed, the batch is in general allowed to react further from about 1 to 24 hours at the same temperature, whereupon the precipitated hydrohalide or hydrochloride is filtered off. After partial evaporation of the reaction mixture and, if necessary another filtration, the product is obtained in the form of a liquid, castable, reactive resin.

In performing the present process both the proportions of the reactants and the reaction conditions may be varied within the indicated limits so that, as required, rather reactive, low viscous or less reactive resinous poly-(β-methylene-propiolactones) of higher viscosity can be obtained.

It has been found that the aforementioned new polylactones yield on reaction with compounds that cause splitting of the diketen groups to form cross-linked products, which are defined as "curing agents" for the polylactones, materials having excellent mechanical and physical properties suitable for a wide variety of uses in technology.

Accordingly, the present invention provides curable mixtures suitable for the manufacture of shaped structures, including flat materials, containing (1) A compound whose molecule contains at least two β-methylene-propiolactone groupings of the formula

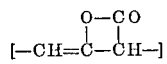

and (2) A curing agent for cross-linking the polylactone (1) and, if desired, (3) A basic curing accelerator.

Suitable curing agents (2) are, for example, compounds that contain more than one hydroxyl, sulfhydryl, carboxylic acid hydrazide or primary or secondary amino group. Preferred classes of such curing agents are:

(a) Polyhydroxy compounds such as saturated and unsaturated dialcohols and polyalcohols, furthermore diphenols and polyphenols.

As saturated dihydric and polyhydric alcohols there may be mentioned: ethyleneglycol, 1,2- and 1,3-propanediol, glycerol, 1,3- and 1,4-butanediol, 1,5-pentanediol, 2-methyl-n-pentanediol-2,4, n-hexanediol-2.5, 2-ethylhexanediol-1,3,2,4,6- and 1,2,6-hexanetriol, trimethylolethane and trimethylolpropane, 2,2'-dihydroxy-di-n-propyl ether, butanetriol-(1,2,4), diethyleneglycol and triethyleneglycol, erythritol, xylitol, arabitol, sorbitol, mannitol, dulcitol, talitol, iditol, adonitol and pentaerythritol, heptitols, 2,2,6,6-tetramethylol-cyclohexanol, cis- and trans-quinitol, hydrogenated diomethane, polyvinyl alcohol, 1,4-dihydroxy-5-chlorocyclohexane; adducts of epoxides, such as ethylene oxide, propylene oxide, epichlorohydrin or styrene oxide, with dialcohols and polyalcohols or with diphenols or polyphenols; monoesters from fatty acids and polyalcohols containing 3 to 4 hydroxyl groups, such as glycerol or pentaerythritol; monoethers from polyalcohols containing 3 to 4 hydroxyl groups, e.g. diglycerol.

As unsaturated polyalcohols there may be mentioned, for example: 2-butenediol-1,4, glycerol monoallyl ether, butane-1,2,4-triol monoallyl ether, 1,1-bis-(hydroxymethyl)-cyclohexene-3 and 1,1-bis-(hydroxymethyl)-4-chloro-cyclohexene-3.

As diphenols and polyphenols there may be mentioned, for example: resorcinol, hydroquinone, 1,4-dihydroxy-5-chlorobenzene, 1,4-dihydroxynaphthalene, 1,5-dihydroxynaphthalene, para,para' - dihydroxy - diphenylmethane, para,para'-di-hydroxydiphenylsulfone, diomethane, para, para' - dihydroxydiphenyl, formaldehyde condensation products with phenols and cresols (novolaks, resols), and 1,1,3-tris-(4'-hydroxyphenyl)-propane.

(b) Di- and polymercaptans; for example: dithioethyleneglycol, trithioglycerol, and the polymeric polysulfides accessible by condensation of sodium polysulfide and dichloroethane or bis-(2)-chloroethyl)-formal, such as are marketed, for example, under the registered trademark Thiokol.

(c) Polycarboxylic acid hydrazides; for example, isophthalic, sebacic, azelaic and hexahydroterephthalic acid dihydrazide, citric acid trihydrazide and polymeric acrylic acid hydrazides.

(d) Primary and secondary diamines and polyamines; for example: ethylenediamine, 1,2-propylenediamine, 1,3-propylenediamine, tetramethylenediamine, hexamethylenediamine, diethylenetriamine, dipropylenetriamine, triethylenetetramine, N,N'-diethylethylenediamine, piperazine, N-(β-aminoethyl)piperazine and the ethylene oxide adducts of primary and secondary diamines and polyamines; N,N'-diisopropyl-ethylenediamine, N,N'-dicyclohexyl - ethylenediamine, N,N' - dibutyl-ethylenediamine; meta-phenylenediamine, para-phenylenediamine, para, para'-diaminodiphenylmethane, 2,4-diaminotoluene, 3,3'-diamino-4,4'-dimethyldiphenylmethane, 1,4-di(cyclohexyl-aminomethyl)-benzene, para,para'-dimethylamino-diphenylmethane, 2,2(para,para'-diaminodiphenyl)propane, para,para'-diaminodiphenylsulfone; furthermore, there may be mentioned in this connection aminotriazines, such as acetoguanamine and benzoguanamine.

It is, of course, also possible to use compounds whose molecule contains at the same time two or more of the afore-mentioned function groupings. Particularly suitable compounds of this type are those which contain at the same time hydroxyl groups and amino groups. As relevant examples there may be mentioned ethanolamine, diethanolamine, hydroxyethyl pentamethylene diamine, triethanolamine, 1,3-diamino-2-hydroxypropane, N-(β-hydroxyethyl)-ethylenediamine, and also adducts of ethylene oxide, propylene oxide or styrene oxide with the afore-mentioned hydroxylamines.

Further suitable are the di- and polyhydroxycarboxylic acid amides accessible by reacting diamines and polyamines with lactones.

Further suitable curing agents (2) are tertiary amines, preferably high-boiling tertiary amines, for example, N,N-dimethyldodecylamine, N,N - dimethyltetradecylamine, N,N-diethyloctadecylamine, quinoline, pyridine, N,N-dimethylbenzylamine, 2,4,6 - tris-(dimethylaminomethyl) phenol, monodimethylaminomethyl phenol, triethanolamine, N,N-dimethylaniline, N,N-diethylaniline, N-(β-hydroxyethyl)-morpholine and N-(β-aminoethyl)-piperazine, Titanic acid esters, such as tetra-n-butyl titanate, are likewise suitable for use as curing agents (2).

If the curing agent (2) does not as such already contain basic groups, such as primary, secondary or tertiary amino groups, it is of advantage to perform the curing reaction in the additional presence of a strongly basic curing accelerator, above all one of the tertiary amines mentioned above in connection with the curing agents.

Since the curing reaction is often strongly exothermic, the curing accelerator used should have a high boiling point or it should contain a functional group which enables the accelerator to be incorporated in the cured product.

Tertiary amines having a high boiling point that are suitable accelerators are, for example: N,N-dimethylbenzylamine, N,N-diethylbenzylamine, quinoline, pyridine, N,N-dimethylaniline, N,N-diethylaniline, N,N-dimethyldodecylamine, N,N-dimethyltetradecylamine and N,N-diethyloctadecylamine.

Tertiary amines suitable as accelerators, that further contain a reactive functional group, are, for example: 2,4,6 - tris - (dimethylaminomethyl) - phenol, mono-dimethylaminomethyl phenol, N,N - diethylethanolamine, methylaminomethyl phenol, N,N - diethylethanolamine, N,N - dimethylethanolamine, N,N-diethylpropylene-1,3-diamine and N-(β-aminoethyl)-piperazine.

It must be borne in mind that the basic amino groups accelerate the curing reaction only if during the reaction, they do not lose their basic nature accompanied by amide formation.

The curing reaction consists in simply mixing at room temperature or with moderate heating the polylactone (1) with the curing agent (2) and possibly the curing accelerator (3) in suitable proportions, and possibly by heating the resulting mixture until complete curing has been achieved.

When the curing agent (2) used is a compound that contains active hydrogen atoms, such as a polyhydroxy compound, polymercaptan, polycarboxylic acid hydrazide or a primary or secondary polyamine, it is usual to employ for every lactone equivalent of the polylactone about 0.7 to 0.9 equivalent of active hydrogen of the curing agent. When primary or secondary diamines or polyamines are used, the curing reaction takes in general an exothermic course even at room temperature. When polyhydroxy compounds and/or tertiary amines are used as curing agents, it is in general necessary to heat the mixture for several hours at temperatures ranging, for example, from 70° to 150° C. to ensure complete curing.

If desired, the curing reaction may be performed in two or more stages. By suitably selecting the reaction conditions, for example the proportions of the reactants, the reaction temperature, type and proportion of curing accelerator, it may occasionally be possible to obtain low-molecular precondensates or so-called B-stages in which the degree of cross-linking is still so low that they can be further processed, for example to form mouldings or laminates.

As a rule, the cross-linked products are manufactured with simultaneous shaping to castings, foamed products, mouldings, lacquer films, laminates, cemented products and the like.

In the industrial processing there is first prepared a mixture which contains the starting components (1) and (2) and possibly the additionally used accelerators (3); these mixtures are poured in casting or moulding patterns, or brushed in the form of lacquer films, or introduced into cemented joins etc. and then cured, generally with heating. Precondensates and B-stages may be applied in a similar manner. In the fully cured state the final products constitute cross-linked, insoluble and infusible mouldings which are hard or flexible, depending on the starting materials used.

The mixtures of the polylactones (1) with non-basic curing agents are in general readily storable at room temperature. For curing, a basic curing accelerator is added to this mixture shortly before it is used. In this case the curable mixture of this invention may be marketed as a two-component system of substantially unlimited shelf life, of which component A consists of a mixture of polylactone and nonbasic curing agent, especially a polyhydroxy compound, whereas component B is the basic curing accelerator, especially a tertiary amine.

The curable mixtures of this invention may be admixed with other curable resins, e.g., aminoplasts, phenoplasts, polyacetals from polyalcohols and aldehydes or epoxy resins, provided such additives are compatible with the said components (1) and (2) and can be cured together with them under the curing conditions used.

The curable mixtures may further be admixed at any stage prior to curing with fillers, plasticizers, pigments, dyestuffs, flame-inhibitors and/or mould lubricants.

Suitable extenders and fillers are, for example, rutile, mica, quartz meal, rock meal, aluminum oxide trihydrate, calcium carbonate, ground dolomite, gypsum or barium sulphate.

To improve the mechanical properties there may be further added fibres or fabrics from glass, polyesters, nylon, polyacrylonitrile, silk or cotton.

Furthermore, for the manufacture of foamed products there may be added propellants, e.g., compounds that give off carbon dioxide or nitrogen under the curing conditions, and/or low-boiling inert organic liquids, such as trichlorofluoromethane.

Parts and percentages in the following examples are by weight.

The determination of the lactone equivalence (=grams of substance per β-methylenepropiolactone group) was carried out by the newly developed titration method described below, since the determination methods described in literature are only suitable for simple dimeric ketens, especially diketens, and give unsatisfactory results when used for compounds of higher molecular weight:

An accurately weighed amount (of the order of about 150 mg.) of the polyactone is dissolved in 10 ml.–15 ml. of absolute dioxane, if necessary with moderate heating, and mixed with shaking with an accurately weighed amount of cyclohexylamine. The mixture is kept in a stoppered flask for 5 minutes at room temperature, and the excess amine is then back-titrated with 0.1 N hydrochloric acid, using bromophenol blue as indicator. If the point of colour change is vague, e.g., owing to a precipitation of insoluble product or to the colour of the titration solution, overtitration is permissible, whereupon by back-titration of the excess hydrochloric acid with 0.1 N sodium hydroxide solution a more accurate point of colour change is obtained.

For the manufacture of the curable mixtures described in the examples the following resinous poly(β-methylenepropiolactones) are used:

Polylactone I 478 g. (2 mols) of sebacic acid dichloride and 184 g. (2 mols) of propionylchloride are dissolved together in 1350 ml. of absolute chlorobenzene and while excluding moisture a solution of 609 g. (6 mols+0.5% excess) of distilled triethylamine in 650 ml. of absolute chlorobenzene is stirred in dropwise at a rate such that the moderately cooled reaction mixture maintains a temperature from 35° to 40° C. and the addition takes about 1½ to 2 hours. On completion of the addition the batch is stirred on for 1 hour at the same temperature, during which specimens taken from it should always give a basic reaction with bromophenol blue. If this should not be the case owing to losses by evaporation, further triethylamine must be added to achieve a positive reaction. For processing, the batch is cooled to 10° C., filtered, and the solvent is evaporated under vacuum. If in this evaporation more triethylamine hydrochloride should precipitate, the batch must be filtered before final concentration to weight constancy in a high vacuum at 90° C. Likewise, no amine must be identifiable with bromophenol in this solution, since otherwise the shelf life of the polylactone would suffer substantially.

There are obtained 375 g. of polylactone in the form of a brown, castable resin (corresponding to 84.5% of the theoretical yield). Lactone equivalence: 222 (determined by the method described above).

Polylactone II

A solution of 812 g. (8 mols+0.5% excess) of triethylamine in 750 ml. of absolute chlorobenzene is stirred dropwise at 35° to 40° C. with exclusion of moisture into a solution of 478 g. (2 mols) of sebacic acid dichloride and 368 g. (4 mols) of propionylchloride in 1350 ml. of absolute chlorobenzene. This addition should be complete within 1½ to 2 hours while cooling moderately. When all has been added, the batch is stirred on for 1 hour at 35° to 40° C. and then worked up as described for polylactone I.

There are obtained 419 g. (=75.5% of theory) of polylactone as a brown resin of low viscosity. Lactone equivalence: 210.

Polylactone III

A solution of 827 g. (8.19 mols+1% excess) of triethylamine in 800 ml. of absolute chlorobenzene is stirred dropwise at 35° to 40° C. with exclusion of moisture into a solution of 576 g. (2.73 mols) of suberic acid dichloride and 251 (2.73 mols) of propionylchloride in 1600 ml. of absolute chlorobenzene, which, with moderate cooling, takes 1½ hours. When all has been added, the batch is stirred on for 1 hour at 35° C. and then worked up as described for the manufacture of polylactone I.

There are obtained 377 g. (=71.2% of theory) of polylactone as a brown, viscous, clear resin. Lactone equivalence: 193.

Polylactone IV

A solution of 609 g. (6 mols+0.5% excess) of triethylamine in 600 ml. of absolute chlorobenzene is stirred dropwise with exclusion of moisture into a solution of 478 g. (2 mols) of sebacic acid dichloride and 268 g. (2 mols) of caproylchloride in 1200 ml. of absolute chlorobenzene at a rate such that moderate cooling suffices to maintain the reaction mixture constantly at 35° to 40° C. The addition takes about one hour. On completion of the addition the batch is stirred on for 2 hours at the same temperature, during which the reaction mixture should give a basic reaction to bromophenol blue. If this is not the case, triethylamine must be added in small portions until a positive reaction is achieved.

For working up the batch is cooled to 10° C., filtered and the solvent evaporated under vacuum. If triethylamine hydrochloride should again precipitate, the batch must be filtered once more. It is then concentrated under a high vacuum until its weight remains constant.

There are obtained 428 g. (=81% of theory) of polylactone as a brown, castable resin. Lactone equivalence: 218.

Polylactone V

In the course of 1½ hours at 25° to 30° C., with exclusion of moisture a solution of 61.2 g. (0.6 mol+1% excess) of triethylamine in 120 ml. of absolute chlorobenzene is stirred dropwise into a solution of 39.4 g. (0.2 mol) of pimelic acid dichloride and 18.5 g. (0.2 mol) of propionylchloride in 120 ml. of absolute chlorobenzene. During this addition moderate cooling is necessary. On completion of the addition the batch is stirred for 2 hours at room temperature and then worked up as described for polylactone I.

Yield: 19.0 g. (=52% of theory) of a light-brown oil. Lactone equivalence: 170.

Polylactone VI

A solution of 81.6 g. (0.8 mol+1% excess) of triethylamine in 80 ml. of absolute ether is stirred dropwise at 25% to 30° C. within 1½ hours, with exclusion of moisture, into a solution of 39.4 g. (0.2 mol) of pimelic acid dichloride and 42.6 g. (0.4 mol) of butyrylchloride in 240 ml. of absolute ether. On completion of the addition the batch is stirred on for 3 hours at 25° C. and then worked up as described for the previous products.

Yield: 30.3 g. (=57.4% of theory) of a light-yellow oil. Lactone equivalence: 286.

Polylactone VII

A solution of 82.4 g. (0.8 mol+2% excess) of triethylamine in 100 ml. of absolute chlorobenzene is stirred dropwise within 1 hour at 45° to 50° C. with exclusion of moisture into a solution of 67.5 g. (0.3 mol) of azelaic acid dichloride and 18.5 g. (0.2 mol) of propionylchloride in 300 ml. of absolute chlorobenzene. On completion of this addition the batch is allowed to react for another 30 minutes at 50° C. and then worked up as described for polylactone I.

Yield: 51.6 g. (=89.8% of theory) of a brown, viscous oil. Lactone equivalence: 158.

Polylactone VIII

A solution of 255.0 g. (2.5 mols+1/ excess) of triethylamine in 400 ml. of absolute chlorobenzene is stirred dropwise with exclusion of moisture into a solution of 239 g. (1 mol) of sebacic acid dichloride and 109.2 g. (0.5 mol) of lauric acid chloride in 800 ml. of absolute chlorobenzene. This addition should take 45 to 60 minutes at a temperature of 40° C., which requires moderate cooling. After allowing the batch to react for another 4 hours at 40° C. it is worked up as described in the preceding examples.

Yield: 210 g. (=81.5% of theory) of a reddish brown, viscous oil. Lactone equivalence: 312.

Polylactone IX

A solution of 163.2 g. (1.6 mols+1% excess) of triethylamine in 320 ml. of absolute chlorobenzene is added dropwise with vigorous stirring to a solution of 143.4 g. (0.06 mol) of sebacic acid dichloride and 31.4 g. (0.4 mol) of acetylchloride in 510 ml. of absolute chlorobenzene. The addition of the first 50 ml. of amine solution should be completed within about 10 minutes so that the reaction mixture heats up to 35° C. owing to the exothermic reaction. The remainder of the amine solution is dropped in within one hour at 35° C. with occasional moderate cooling. On completion of the addition the batch is stirred on for one hour, during which it reaches room temperature, after which the amine reaction with bromophenol blue should be positive. The batch is worked up as described for polylactone I.

Yield: 93.7 g. (=80.9% of theory). Lactone equivalence: 248.

Example 1

An intimate mixture of 6.960 g. of polylactone I, 0.815 g. of glycerin and 0.075 g. of N,N-dimethyl-tetradecylamine (=1%, referred to the total weight of the mixture) as accelerator is degassed; for this purpose the batch as a whole is heated to about 50° C.

The batch is then cured for 3 hours at 120° C., to form a clear, flexible casting which is scratch-resistant.

A casting having similar properties is obtained when in the above example polylactone I is replaced by an equivalent amount of polylactone IV.

Example 2

0.610 g. of freshly distilled trimethylolpropane is suspended in 3.038 g. of polylactone I by cautious heating and then 0.040 g. of N,N-dimethyl-tetradecylamine (=1%, referred to the whole batch) is added as accelerator. The whole is intimately mixed, degassed and then cured for 6 hours at 120° C., to form a hard, slightly flexible clear body.

Example 3

60.0 g. of polylactone I are mixed with 51.8 g. of a hexanetriol-styrene oxide adduct (OH number: 582 mg. KOH/g.) and 1.1 g. of N,N-diethyl-octadecylamine are stirred in as accelerator. The batch is intimately mixed and degassed at 50 to 60° C. and then cured for 13 hours at 100° C., to form a flexible, clear casting.

The hexanetriol-styrene oxide adduct used above was prepared in the following manner:

2.0 ml. of a 48% solution of boron trifluoride in diethyl ether are dissolved in 804 g. (6 mols) of fused trimethylolpropane, and in the course of 75 minutes 720 g. of styrene oxide are dropped into this solution at 85° to 90° C. On completion of the addition the batch is stirred for another 2 hours at the same temperature, then dissolved in 2 litres of methanol, and the solution is percolated during 6 hours through a column of 4.2 x 20 cm. filled with a basic anion exchange resin (styrene resin with tertiary amino groups, marketed under the registered trademark (Dowex-IX). Finally, the eluate is concentrated under a high vacuum at 90° C. until its weight remains constant.

There are obtained 1501 g. (=98.4% of theory) of the adduct; it has a hydroxyl number of 582 mg. KOH/g.

Example 4

78.4 g. of polylactone III are mixed with 33.5 g. of the hexanetriol-styrene oxide adduct described in Example 3, and 1 g. of N,N-dimethyl-tetradecylamine is added as accelerator. The batch is intimately mixed and degassed and then cured for 16 hours at 100° C., to form a clear, slightly flexible casting which can be mechanically worked.

Example 5

The following solutions are prepared:

Solution A.—2.220 g. of polylactone I are dissolved in 5 ml. of chloroform and diluted to 10 ml. The solution contains 1 milliequivalent of lactone per cc.

Solution B.—0.890 g. of para,para'-diaminodiphenylmethane is dissolved in 5 ml. of chloroform and made up to 10 ml. The solution contains 0.9 milliequivalent of amine per cc.

1 ml. each of the above solutions are mixed and poured over sheet aluminum. The chloroform is shortly evaporated at about 30° to 50° C., and the lacquer coat is cured for 30 minutes at 100° C.

The lacquer coat thus obtained is even at temperatures of 180° C. scratch-resistant, nonbrittle, not affected by immersion in acetone for 15 hours and reveals no signs of a change after having been heated for 3 hours in boiling water.

Example 6

While being cooled, 1.050 g. of polylactone II are rapidly mixed with 0.580 g. of hexamethylenediamine, whereupon a strongly exothermic reaction sets in immediately and the mass undergoes curing.

The resulting, cured casting is clear and hard.

Example 7

While being cooled, 3.784 g. of polylactone I are rapidly and intimately mixed with 1.830 g. of N,N'-dicyclo-hexyl-ethylenediamine, whereupon an exothermic reaction sets in immediately and the product undergoes curing.

The resulting casting is clear and hard.

Example 8

While cooling, 1.05 g. of diethanolamine and 80 mg. of N,N-dimethyl-tetradecylamine are rapidly stirred into 8.80 g. of polylactone II, the whole is intimately mixed and degassed, whereupon an exothermic reaction is observed which gradually subsides while the product undergoes moderate further curing; it is then further cured for 3 hours at 140° C. to form a tough, flexible casting.

Example 9

A solution of 1 g. of N,N-dimethyldodecylamine in 95 g. of polylactone I is intimately mixed, degassed and cured for 15 hours at 140° C., to form a hard, slightly flexible casting.

Example 10

A solution of 1 g. of N,N-dimethyl-tetradecylamine in 95 g. of polylactone II is intimately mixed, degassed and cured for 15 hours at 100° C., to form a hard, slightly flexible casting.

Example 11

A solution of 1 g. of N,N-dimethyl-tetradecylamine in 90 g. of polylactone III is intimately mixed, degassed and cured for 7 hours at 100° C., to form a slightly flexible, hard casting.

Example 12

990 mg. of finely powdered hydroquinone are stirred into 5720 mg. of polylactone VI and heated to 120° to 130° C., whereupon a homogeneous solution forms which remains intact on being cooled to about 50° C. to 50 mg. of N,N-dimethyl-tetradecylamine as catalyst are then stirred in, the batch is degassed and cured at 80° C. After 2 hours a hard, light-yellow body is obtained.

Example 13

3650 mg. of powdered diomethane are stirred into 6320 mg. of polylactone VII. The mixture is then cautiously heated to 130° to 150° C. until a homogeneous solution has formed which remains homogeneous on cooling to about 50° C., at which temperature it is mixed with 80 mg. of N,N-dimethyl-dodecylamine. The catalyst is stirred in, the mixture degassed and cured for 4 hours at 100° C., to form a yellow, hard, slightly flexible body.

Example 14

1130 mg. of ethanedithiol are stirred into 5100 mg. of polyactone V, whereupon a weakly exothermic reaction ensues. 60 mg. of N,N-dimethyldodecylamine as catalyst are stirred into the homogeneous solution and the mixture is degassed. Curing for 4 hours at 80° C. furnishes a body resembling hard rubber.

Example 15

100 mg. of N,N-dimethylbenzylamine as curing agent are stirred into 10 g. of polylactone VII and the mixture is cured for 15 hours at 70° C., to form a dark-brown, slightly flexible body.

Example 16

870 mg. of isophthalic acid dihydrazide are dissolved with heating in 15 ml. of dimethylformamide. The batch is then cooled until crystallization sets in (about 80° C.), and 3120 mg. of polylactone VIII are stirred in. The batch heats upslightly and forms a clear, yellow lacquer solution which is poured over aluminum sheets and cured at 150° C.

After 5 minutes the film is dust-dry and after about 45 minutes scratch-resistant and flexible.

Example 17

The following solutions are prepared:

Solution A.—Containing 68 mg. of tetra-n-butyl-orthotitanate per cc. of absolute dioxane (corresponding to 0.2 millimol of tetra-n-butyl-orthotitanate per cc. solution).

Solution B.—Containing 248 g. of polylactone IX per cc. of absolute dioxane (uorresponding to 1 milliequivalent of lactone per cc.).

A lacquer is prepared from equal parts by volume of the two solutions and poured over aluminum sheets. After curing for 45 minutes at 180° C., scratch-resistant, flexible films are obtained.

What is claimed is:

1. A curable composition of matter comprising
   (1) a compound containing at least two β-methylene-propiolactone groupings of the formula

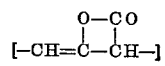
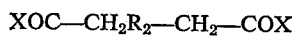

obtained by reacting a monocarboxylic acid halide of the formula $R_1$—$CH_2$—COX and a dicarboxylic acid halide of the formula

XOC—$CH_2R_2$—$CH_2$—COX in the presence of an inert solvent with an amount of a tertiary amine equivalent to the carboxylic acid halide groups, $R_1$ being hydrogen, monovalent aliphatic hydrocarbon, aromatic hydrocarbon, cycloaliphatic hydrocarbon or araliphatic hydrocarbon radical and $R_2$ being divalent aliphatic hydrocarbon, aromatic hydrocarbon, cycloaliphatic hydrocarbon and araliphatic hydrocarbon and X being chlorine, bromine or iodine, and
   (2) a cross-linking agent for the polylactone selected from the group consisting of polyhydroxy compounds, polymercaptans, polycarboxylic acid hydrazides, primary and secondary polyamines, tertiary amines, titanic acid esters and amino alcohols.

2. A curable composition of matter comprising
   (1) a compound containing at least two β-methylene-propiolactone groupings of the formula

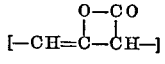
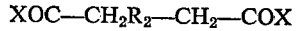

obtained by reacting a monocarboxylic acid halide of the formula $R_1$—$CH_2$—COX and a dicarboxylic acid halide of the formula

XOC—$CH_2R_2$—$CH_2$—COX in the presence of an inert solvent with an amount of a tertiary amine equivalent to the carboxylic acid halide groups, $R_1$ being hydrogen, monovalent aliphatic hydrocarbon, aromatic hydrocarbon, cycloaliphatic hydrocarbon or araliphatic hydrocarbon radical and $R_2$ being divalent aliphatic hydrocarbon, aromatic hydrocarbon, and X being chlorine, bromine or iodine,
   (2) a cross-linking agent for the polyactone selected from the group consisting of polyhydroxy compounds, polymercaptans, polycarboxylic acid hydrazides, primary and secondary polyamines, tertiary amines, titanic acid esters and amino alcohols and
   (3) a basic curing accelerator.

3. A composition as claimed in claim 1 containing a polylactone (1) obtained by reacting a member of the group consisting of acetylchloride and propionylchloride with a member selected from the group consisting of sebacic acid dichloride, azelaic acid dichloride and suberic acid dichloride in the presence of chlorobenzene as solvent with an amount of triethylamine equivalent to the carboxylic acid chloride groups.

4. A composition as claimed in claim 2, containing as curing accelerator (3) a tertiary amine.

5. A mixture as claimed in claim 4, containing a high-boiling tertiary amine as curing accelerator.

References Cited

UNITED STATES PATENTS

| | | | |
|---|---|---|---|
| 2,675,392 | 4/1954 | Theobald | 260—343.9 |
| 2,840,548 | 6/1958 | Howk et al. | 260—78.3 |
| 3,153,019 | 10/1964 | Spes et al. | 260—78.3 |

JAMES A. SEIDLECK, *Primary Examiner.*

U.S. Cl. X.R.

117—132; 260—2.5, 17.4, 32.6, 41, 47, 78.4, 343.9, 836, 844, 851, 898